Figure 1:
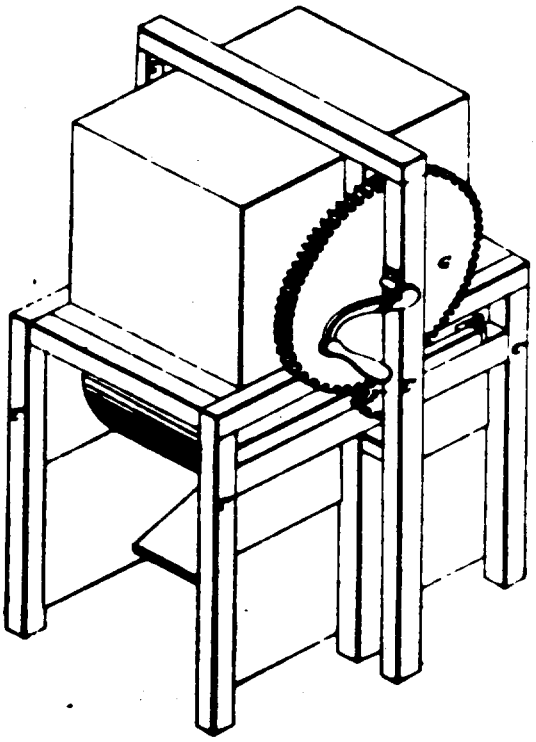
Figure 2:
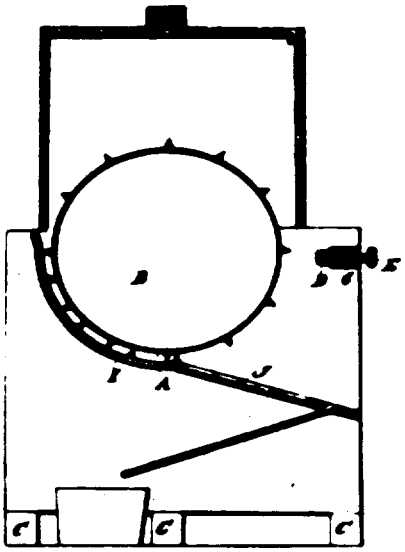
Figure 3:
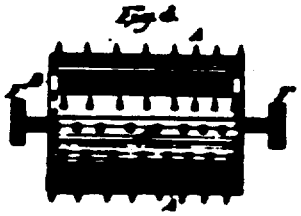
Figure 4:
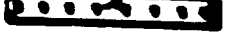

BEST AVAILABLE COPY

X 8482

R. HOYT.

Corn Sheller.

2 Sheets—Sheet 1.

Patented Oct. 31, 1834.

NO PRINTED SPECIFICATIONS AVAILABLE

BEST AVAILABLE COPY
R. HOYT.
Corn Sheller.
Patented Oct. 31, 1834.
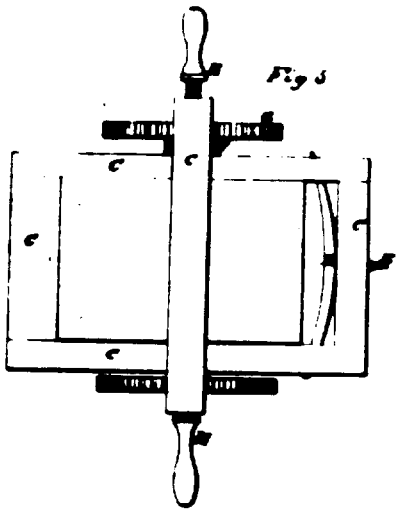
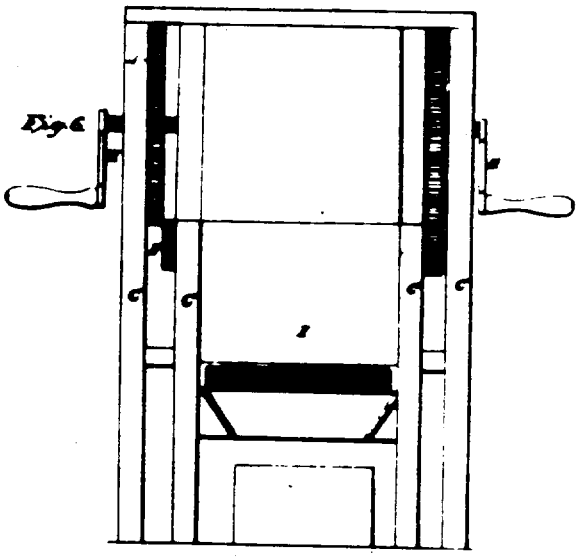
Fig 7.
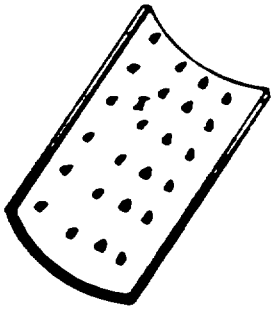

Oct 31. 1834  8482X  441

Rodney Hoyt. Miamisburg Ohio
Letters Patent

The Schedule referred to in these Letters Patent and making part of the same containing a description in the
words of the said Rodney Hoyt himself of his improvement in the Corn Shelling Machine To all to whom these presents shall come. Be it known that I Rodney
Hoyt of Miamisburg in the County of Montgomery and State of Ohio. have invented a new and useful im:
provement in the Corn Shelling Machine. and that the following is a full and exact description of said machine
as improved by me — For one hand power. The frame is 30 inches long 20 inches wide & 28 inches high
made of good strong timber 2 1/2 inches square. On each side within the frame is firmly screwed or nailed
a plank 1 1/2 inch thick 13 inches wide and of the length of the frame to receive the concave. The
frame to be lined below these planks with 1/2 inch stuff with a schute or conductor to carry off the corn
the ends of the machine to be covered with plank on the outside 13 inches wide. The concave is made
of cast iron with teeth one half inch long. three fourth inch wide and one inch apart and is made to
encircle one fourth the circumference of the cylinder. This concave is placed at one end of the frame fitted
into two grooves cut into the side pieces of the frame inclining to an angle of about 45 degrees. The Cylinder
is 12 1/2 inches long & 17 1/2 inches in diameter. it is made by screwing staves of cast iron on two heads
cut out of two inch plank. These cast staves are covered with teeth similar to those on the concave and
made to run in spiral form around the Cylinder. The Cylinder is placed on two slides working in
two grooves cut on the top of the side pieces. at the opposite end of the machine from the concave is
a spring of elastic wood or steel running across the frame and at the centre of the spring is a tem-
porary screw to regulate the opening to admit the ears. against each end of this spring the slides are
made to press for the purpose of letting the cylinder work too and from the concave to admit different
sized ears. On the right hand side of the machine are two posts four feet high. and on the left hand
side one of the same height. all of which are secured by a cap piece. These posts are of timber 2 1/4 inches square.
Between these two upright posts the driving wheel is made to work. This is a common cog wheel of cast
Iron and made to work in and over the follower or small wheel which is attached to the end of the
shaft of the cylinder. To increase power there is a driving wheel on the left hand side of the ma-
chine in every respect similar to the one on the right hand side. this wheel is made to be thrown in
and out of gear at pleasure so that the machine may be worked by one or two hands.
There is a wire screen from under the cylinder running parallel with the schute to separate the cobs
from the corn. Over the top of the cylinder is a tight cap or box made to prevent the corn from fly-
ing upwards. To put the machine in motion, the large wheel is turned by a crank which ope-

8482X ates on the cylinder. between the cylinder and the concave drop the ears of corn and in passing through
hey will be completety shelled. The parts of the above specified machine which I claim as my invention
re the concave in which the cylinder works. I claim the cylinder as formed wi th metal sur-
face giving it the properties of a fly wheel making it keep longer in motion than if the cylinder were
formed of a solid substance. The form of the teeth on the concave I claim as original and the left
hand wheel to increase power & the manner in which it is thrown in and out of gear.
I claim the spring of steel or elastic wood and the position in which it works. and the screw regula-
ting the opening to admit the ears. I claim the slide on which the cylinder works and the screen to sep-
rate the cobs from the corn. I claim the right to increase size and power to any extent.

Witnesses
Wm Savage
Wm Gondy

Rodney Hoyt

Drawing (820 [illegible]